US006567190B1

(12) United States Patent
Reele

(10) Patent No.: US 6,567,190 B1
(45) Date of Patent: May 20, 2003

(54) MULTI-FUNCTIONAL SCANNER AND METHOD OF ASSEMBLING SAME

(75) Inventor: Samuel Reele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/435,099

(22) Filed: Nov. 5, 1999

(51) Int. Cl.$^7$ .................................................. H04N 1/04
(52) U.S. Cl. ........................ 358/474; 358/497; 358/498
(58) Field of Search ................................ 358/474, 497, 358/498

(56) References Cited

U.S. PATENT DOCUMENTS

| | | |
|---|---|---|
| 4,438,459 A | 3/1984 | Levine |
| 4,588,282 A | 5/1986 | Levine |
| D285,564 S | 9/1986 | Bevilacqua et al. |
| 5,070,467 A | 12/1991 | Todome |
| 5,115,374 A | 5/1992 | Hongoh |
| 5,392,447 A | 2/1995 | Schlack et al. |
| 5,416,610 A | 5/1995 | Kikinis |
| 5,550,938 A * | 8/1996 | Hayakawa et al. .... 235/462.25 |
| 5,555,105 A | 9/1996 | Shahir et al. |

\* cited by examiner

*Primary Examiner*—Edwards Coles
*Assistant Examiner*—Heather D Gibbs
(74) *Attorney, Agent, or Firm*—Walter S. Stevens; Norman Rushefsky

(57) ABSTRACT

A multi-functional scanner and method of assembling same. In this regard, the invention provides a combination scanning, editing and display apparatus contained in a single housing. The scanner is configured as a flatbed scanner with a display screen mounted in a cover belonging to the scanner. The display screen is touch sensitive for editing images and electronically inputting text. The scanner has electronic input connections such as CD disk, CDR disk, DVD disk, floppy, electronic memory cards, and smart cards to display images directly from these devices or store images directly in memory. The scanner is capable of interrogating an output device (e.g., printer) that may be connected to the scanner for determining type of output device and format of output.

16 Claims, 3 Drawing Sheets

MULTI-FUNCTIONAL SCANNER AND METHOD OF ASSEMBLING SAME

FIELD OF THE INVENTION

This invention relates generally to scanning apparatus and methods of assembly, and more particularly relates to a multi-functional scanner and method of assembling same, the scanner incorporating displays, image and text editing, and electronic data input and printer sensing functions.

BACKGROUND OF THE INVENTION

Optical scanning apparatus are well known in the prior art. In a conventional flatbed scanner, an object is placed on a transparent plate and the scanning unit is moved relative to the transparent plate to scan the object. These scanners typically are used as peripheral input devices connected to a computer memory to store images and text into the computer memory. Such scanning apparatus utilize light-sensing devices to scan the object and then digitize the information therefrom for input into the computer memory.

A type of scanner is the "Image Magic Print System"™ available from the Eastman Kodak Company located in Rochester, N.Y. The "Image Magic Print System"™ contains multiple units in separate housings and each unit performs a separate function. All units may be interconnected to each other through custom software and custom firmware. That is, this system performs multiple functions in addition to scanning. The multiple functions of the "Image Magic Print System"™ include: (1) scanning of an image on negatives or print media; (2) viewing by using a monitor/LCD (Liquid Crystal Display); (3) processing the image, and (4) editing the image, typically via a keyboard, "mouse", or touch screen. In addition to performing these functions, the "Image Magic Print System"™ also provided for data input by means of a digital disk, such as a CD (Compact Disk), CDR (Compact Disk Recordable), DVD (Digital Video Disk), magnetic "floppy" disk, electronic memory cards, and/or "smart card" which serve as additional data input mechanisms supplementing the scanning function. However, the units that perform the functions mentioned hereinabove are each disposed in a separate housing. Having the units in separate housings necessarily increases costs because each unit is purchased and maintained separately. Moreover, the "Image Magic Print System"™ apparently is not capable of automatically sensing type of output device (e.g., type of printer) which may be connected to the "Image Magic Print System"™.

Another scanning system is disclosed by U.S. Pat. No. 5,392,447 to Schlack et al. titled "Image-based Electronic Pocket Organizer with Integral Scanning Unit", which is assigned to the assignee of the present invention. The Schlack et al. patent discloses an electronic organizer that incorporates both text and image data entry means for entering information into memory disposed in the organizer. The unit includes a document transport system, a linear electronic scanner, and a display that has a touch sensitive screen for editing data. However, the Schlack et al. patent does not disclose that the organizer is capable of sensing type of printer that may be connected to the organizer.

Also, U.S. Pat. No. 5,070,467 to Todome et al. discloses a combination copier, facsimile, printer, and scanner system disposed in a single housing with an integrated display and touch sensitive screen. However, the Todome et al. device apparently is not capable of sensing type of printer in the system.

Optical scanners have also been added to portable computers such as is disclosed in U.S. Pat. No. 5,115,374 to Hongoh et al., wherein a scanner and facsimile device are incorporated into a laptop computer. However, the Hongoh et al. device appears limited to facsimile output, which is unsuitable for high-quality printer output requirements.

U.S. Pat. No. 5,550,938 to Hayakawa et al. discloses a host computer and/or word processor with a touch screen display and a scanner. However, Hayakawa et al. does not integrate the host computer and/or word processor functions with the scanner, as a single unit. In addition, the scanner of the Hayakawa et al. device must be operated manually, thereby limiting scanning speed. Also, the Hayakawa et al. device is specifically directed to scanning relatively small input formats (e.g., business cards); therefore, size of material to by scanned by the Hayakawa et al. device is limited to small formats.

U.S. Pat. No. 5,416,610 to Kikinis discloses a computer that utilizes a photosensitive transparent overlay on the computer display screen for scanning and editing documents. The Kikinis patent addresses the scanning speed issue by obviating need to perform manual scanning. However, the Kikinis device is not capable of sensing type of printer which may be connected to the computer.

SUMMARY OF THE INVENTION

It is an object of the present invention to provide a multi-functional scanner and method of assembling same, the scanner incorporating displays, image and text editing, and electronic data input and printer sensing functions in a single housing for reducing equipment maintenance costs.

The present invention resides in an image scanning and display apparatus, comprising a housing having a transparent plate thereon for receiving an object to be scanned, the housing containing all image scanning and display functions complete with integrated electronics and optics; an optical sensing device below said transparent plate including a light source and a plurality of focusing lens for scanning a document, light sensors and electronic circuits for converting the scanned images and text to digital data; a scanner memory within the housing for storing digitized data of images and text; a cover connected to said housing for covering the transparent plate and the object to be scanned; a display contained within said cover having a touch sensitive screen for editing images, text and entering data; and peripheral input connections for entering digitized images and text directly into the scanner display and memory.

According to an aspect of the present invention, a multi-functional scanner is provided in a single unit that is capable of image display and convenient image and text editing, such as by means of a touch sensitive PIP display screen. The scanner includes a housing and a cover connected to the housing. The cover includes the display screen. Electronics within the housing include memory for storing the images and text. Electronic input devices such as CD, CDR, DVD, "floppy" disk, electronic memory card, and smart card are provided as an alternative means for image and text input to the memory of the multi-functional scanner.

BRIEF DESCRIPTION OF THE DRAWINGS

While the specification concludes with claims particularly pointing-out and distinctly claiming the subject matter of the present invention, it is believed the invention will be better understood from the following description when taken in conjunction with the accompanying drawings wherein:

DETAILED DESCRIPTION OF THE INVENTION

Figure 1:
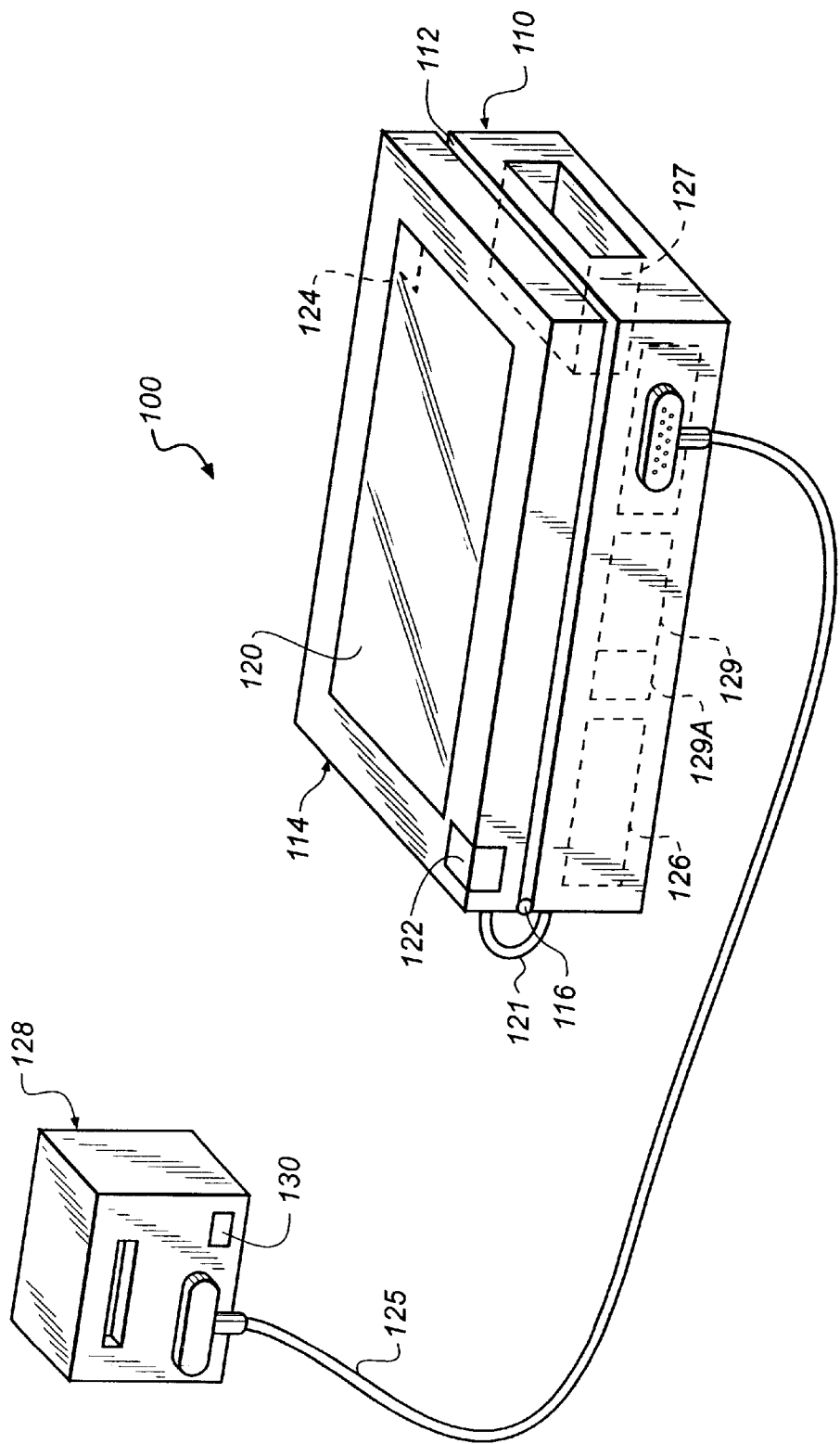
FIG. 1 illustrates a multi-functional scanner in accordance with the principles of this invention.

Shown in FIG. 1 is a multi-functional scanner 100 in accordance with the principles of this invention. The scanner 100 includes a housing 110 having a transparent plate 112. An object (not shown) to be scanned is placed on the transparent plate 112 and a scanning unit (not shown) disposed in housing 110 is moved relative to the transparent plate 112 to scan the object. The object may be printed matter and may include image (i.e., pictorial) and/or text. A light sensing device (not shown) and optical lenses and mirrors (also not shown) are used to scan the object. Light reflected from the scanned object is captured by the light sensing device (not shown) and digitized to define digitized information. The digitized information is provided by known electronic circuitry disposed in housing 110. Such circuitry is commercially available from Mitsubishi of Japan. This digitized information is then stored in a RAM memory 126, as discussed hereinbelow. A cover 114 is pivotably connected to housing 110, such as by means of a pivot pin 116, for covering the transparent plate 112 in order to prevent outside ambient light from reaching transparent plate 112 during the scanning process. Cover 114 also serves as a dust cover for transparent plate 112.

A first image display 120 is mounted on the cover 114 of the scanner 100. An electrical connection 121 carries data from RAM 126 to image display electronics 122 located in the cover 114. Electronics include software and hardware to control the functional modes of the scanner 100. Such software and hardware are commercially available from Seiko-Epson of Japan. The first image display 120 comprises any of known display technologies, which includes, but is not limited to the following: a) organic LED display technology, b) inorganic LED display technology, c) LCD display technology; d) TFT (Thin Film Transistor) display technology, and e) thin cathode ray tube technology.

The first image display 120 is a touch sensitive panel that allows the image to be edited. The first image display 120 also contains PIP display area such as 124 wherein the scanner's 100 functional modes may be controlled. These functional modes include selection of (1) data input format; (2) viewing format; (3) editing of data; (4) data archival location; (5) output format; and (6) output device. Selection of functional modes is controlled by means of the operator manipulation of icons visible on touch-sensitive image display 120. Also the software provides a "virtual" keyboard image on the first image display 120, so that the operator of scanner 100 can input and edit text data on the touch sensitive panel of the first image display 120.

As shown in FIG. 1, an electrical connector 125 is provided so that scanned images that have been stored in RAM 126, whether in the scanned state or post edited state, can be transmitted to an output device such as a hard-copy printer 128. First "smart" electronics are contained in area 129 which enable the multi-functional scanner 100 to interrogate and sense the type of output printer 128 that is connected and presently active. Such "smart" electronics 129, the form of firmware and combination logic is commercially available from Atmel Corporation located in San Jose, Calif. The output printer 128 may be, for example, a laser printer, an LED printer, a thermal printer, or an inkjet printer. A second "smart" electronics 130 in the form firmware embedded in programmable logic devices is available from any of a number of companies, such as Altera, Incorporated, located San Jose, Calif. Smart electronics 130 is disposed in output device 128. After sensing type of printer 128 that is connected to the multi-functional scanner 100, the scanner 100 will use ROM (Read Only Memory) look-up tables located in area 129A and additional RAM ( Random Access Memory) memory/microprocessor electronics located in section 126 collectively to re-configure and re-weight the digitized bit stream of data received from RAM 126 in order to match the color science requirements for the printer's technology. This enables high quality photographic output prints independent of type of printer being used. In this manner, the scanner 100 enables convenient use of many different types of output printers.

Housing 110 also contains electronics for an electronic input device 127 such as the previously mentioned CD, CDR, DVD, "floppy" disk, electronic memory card, or smart card. RAM 126 of scanner 100 retrieves images and documents directly from the input device 127. The previously mentioned scanner software allows these images to be shown on the first image display 120 for editing or merging with other documents stored in the memory.

Figure 2:
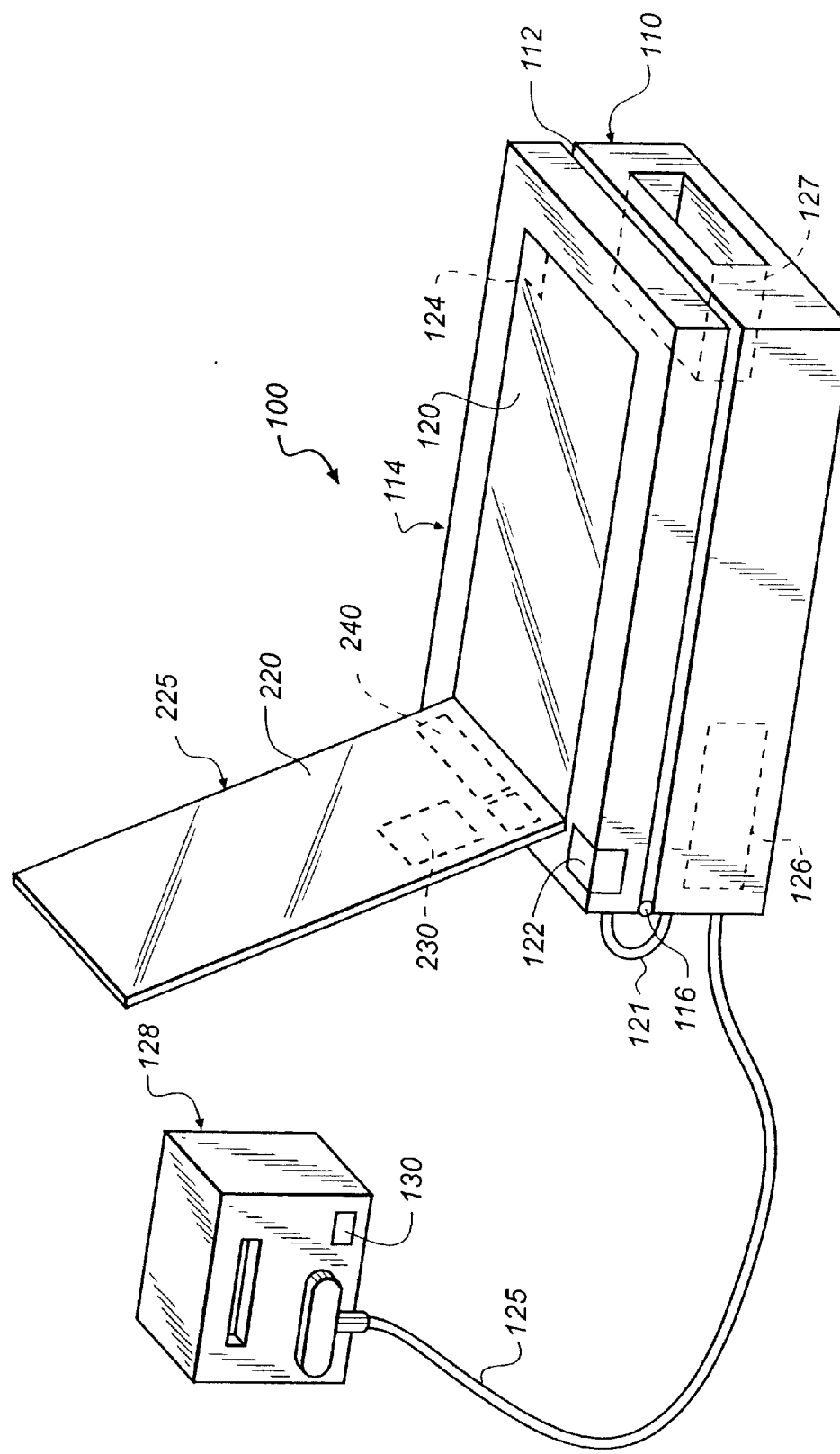
FIG. 2 illustrates an alternate embodiment of the multi-functional scanner in accordance with the principles of this invention.

FIG. 2 illustrates an alternate embodiment of the scanner 100. In this configuration, a flip cover 225 contains a second image display 220. An area 230 of the image display provides the previously mentioned PIP display which may be utilized to view a second image or text. An additional area 240 in this flip cover 225 provides a "virtual" keyboard for editing text or touch screen to edit the image being viewed.

Figure 3:
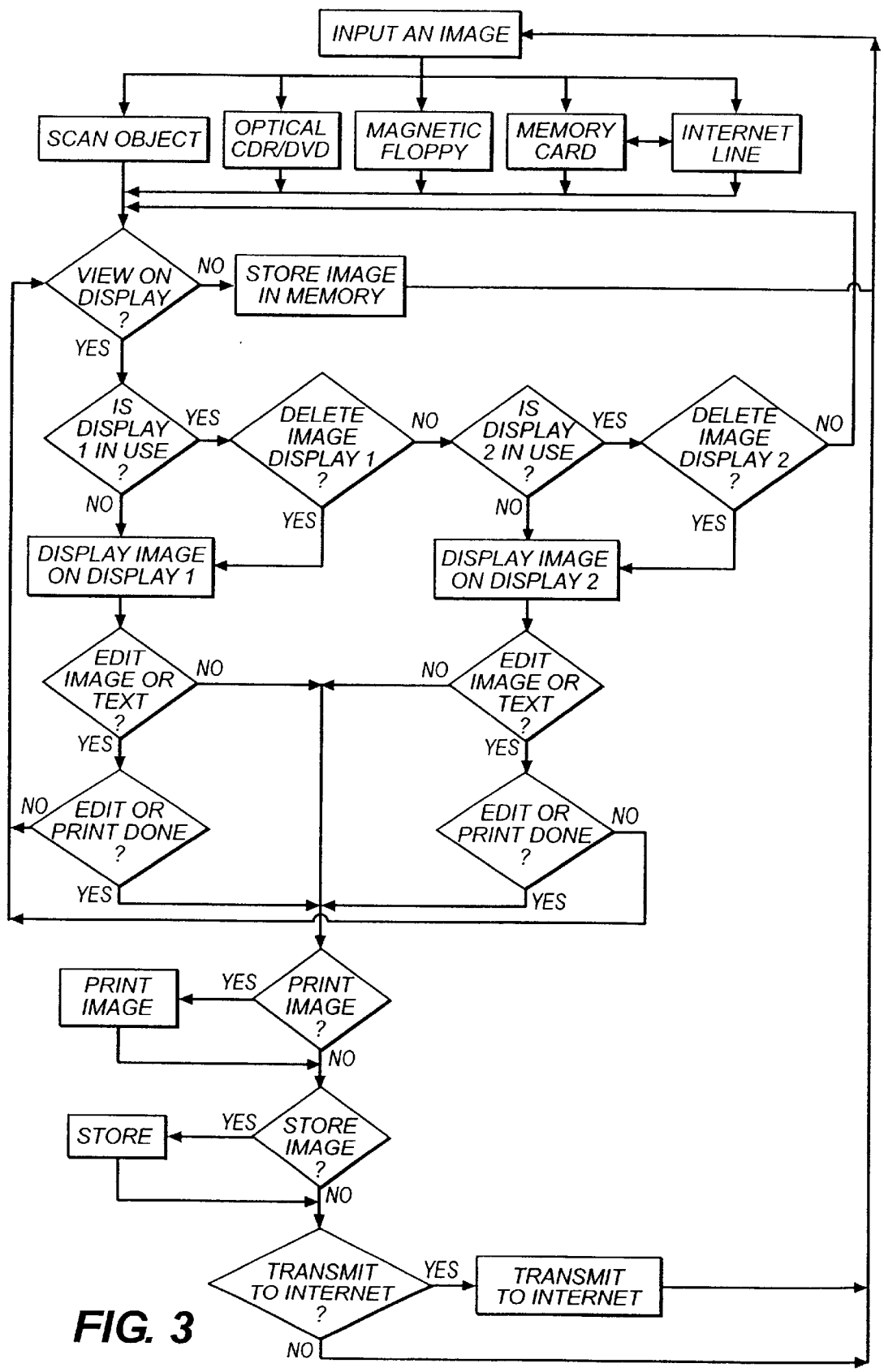
FIG. 3 illustrates a functional flowchart of the multi-functional scanner in accordance with the principles of this invention.

FIG. 3 illustrates the scanning operations in a schematic flow diagram. Images and text may be displayed by scanning as herein described, or by input from the electronic input device, such as the CD, CDR, DVD, "floppy" disk, electronic memory card, or smart card. In addition, modems and communications software can be added to the scanner 100 to allow the operator to view images downloaded from the Internet. The communications software may be of a type available from Microsoft Corporation, located in Redwood, Calif. Information is displayed to the operator in the display window 240 concerning every functional mode of the scanner 100. These functional modes may first be displayed in the image window 220 of the flip cover 225. Once the functional mode is selected by the operator, the scanner 100 either displays the image on the flip cover 225 or stores it in RAM 126. The functional modes also initiate whether the operator wishes to view another image or an expanded view of an area with the same image by means of the PIP display area 230.

As indicated hereinbelow, components usable with the invention are available from a number of suppliers. For example, CD's and CDR's may be of a type such as is available from Sony Of Japan and Matsushita of Japan, respectively. DVD's are available from Matsushita of Japan. Electronic memory cards are available from SanDisk of San Jose, Calif. A scanner memory is available from Mitsubishi of Japan. An electronic pen is available from Seiko of Japan.

The invention has been described in detail with particular reference to certain preferred embodiments thereof, but it will be understood that variations and modifications can be effected within the spirit and scope of the invention.

PARTS LIST

100 . . . Multi-function scanner
110 . . . housing

112 ... transparent plate
114 ... cover
116 ... cover pivot bar
120 ... first image display
121 ... electrical connection
122 ... display electronics
124 ... picture-in-picture area
125 ... electrical connector
126 ... RAM (Random-Access-Memory)
127 ... input device
128 ... output device
129 ... first smart electronics
129A ... ROM (Read-Only-Memory)
130 ... second smart electronics
220 ... second image display
225 ... flip cover
230 ... picture-in-picture display
240 ... keyboard display

What is claimed is:

1. A multi-functional scanner, comprising:

a) a housing;

b) a transparent plate connected to said housing for receiving an object to be scanned;

c) an optical sensing device disposed in said housing and in optical communication with said transparent plate for optically sensing the object and for generating scanned data representative of the object;

d) an electronic circuit disposed in said housing and coupled to said optical sensing device for converting the scanned data to digital data;

e) a ROM disposed in said housing said ROM containing a look-up table defining color science weights associated with an output device that is coupled to said housing for producing a reproduction of the image, the color science weights operating on the digital data to generate weighted digital data in order to match color science requirements of the output device;

f) a RAM disposed in said housing and coupled to said electronic circuit disposed in said housing, said RAM adapted to receive and store the scanned digital data and connected to the output device, said RAM adapted to receive and store the weighted digital data and thereafter transmit the weighted digital data to the output device;

g) an electronic input device integrally connected to said housing and coupled to said RAM for entering the digital data into said RAM;

h) first smart electronics disposed in said housing and adapted to be coupled to a second smart electronics coupled to the output device, said first smart electronics adapted to sense type of the output device and format of RAM output data required by the output device by interrogating information contained in the second smart electronics, said first smart electronics adapted to sense said ROM for determining the color science weights to be applied to the digital data to define color science weighted digital data and storing the color science weighted digital data in said RAM memory, the color science weighted digital data stored in said RAM memory being transmittable to the output device under control of said first smart electronics;

i) a cover connected to said housing for covering said transparent plate and the object to be sensed by said optical sensing device, so that said transparent plate and the object are free of ambient light as the object is optically sensed; and j) a display mounted on said cover and coupled to said optical sensing device for displaying an image of the object optically sensed by said optical sensing device, said display having a touch sensitive screen for editing the image of the object.

2. The multi-functional scanner as recited in claim 1, wherein said smart electronics is a microprocessor.

3. The multi-functional scanner as recited in claim 1, wherein said electronic input device is adapted to receive a floppy disk.

4. The multi-functional scanner as recited in claim 1, wherein said electronic input device is adapted to receive a digital disk.

5. The multi-functional scanner as recited in claim 1, wherein said electronic input device is adapted to receive a smart card.

6. The multi-functional scanner as recited in claim 1, wherein said electronic input device is adapted to receive an electronic memory card.

7. The multi-functional scanner as recited in claim 1, wherein said electronic input device is adapted to be connected to an internet for receiving the digital data therefrom.

8. The multi-functional scanner as recited in claim 1, wherein said display is further comprised of a picture-in-picture display for displaying a plurality of the images simultaneously.

9. A method of assembling a multi-functional scanner, comprising the steps of:

(a) providing a housing;

(b) connecting a transparent plate connected to the housing for receiving an object to be scanned;

(c) disposing an optical sensing device in the housing and in optical communication with the transparent plate for optically sensing the object and for generating scanned data representative of the object;

(d) disposing an electronic circuit in the housing and coupled to the optical sensing device for converting the scanned data to digital data;

(e) disposing a ROM in the housing, the ROM containing a look-up table defining color science weights associated with an output device, the output device being coupled to the housing for producing a reproduction of the image, the color science weights operating on the digital data to generate weighted digital data in order to match color science requirements of the output device;

(f) disposing a RAM in the housing and coupling the RAM to the electronic circuit disposed in the housing, the RAM adapted to receive and store the scanned digital data and connected to the output device, the RAM adapted to receive and store the weighted digital data and thereafter transmit the weighted digital data to the output device;

(g) integrally connecting an electronic input device to the housing and coupled to the RAM for entering the digital data into the RAM;

(h) disposing first smart electronics in the housing, said first smart electronics adapted to be coupled to a second smart electronics coupled to the output device, the first smart electronics adapted to sense type of the output device and format of RAM output data required by the output device by interrogating information contained in the second smart electronics, the first smart electronics adapted to sense the ROM for determining the color science weights to be applied to the digital data to define color science weighted digital data and storing the color science weighted digital data in the RAM memory, the color science weighted digital data stored in the RAM memory being transmittable to the output device under control of the first smart electronics;

(i) connecting a cover to the housing for covering the transparent plate and the object to be sensed by the optical sensing device, so that the transparent plate and the object are free of ambient light as the object is optically sensed; and (j) mounting a display on the cover and coupled to the optical sensing device for displaying an image of the object optically sensed by the optical sensing device, the display having a touch sensitive screen for editing the image of the object.

10. The method as recited in claim 9, wherein the step of disposing a first smart electronics comprises the step of disposing a microprocessor.

11. The method as recited in claim 9, wherein the step of integrally connecting an electronic input device comprises the step of adapting the input device to receive a floppy disk.

12. The multi-functional scanner as recited in claim 9, wherein the step of integrally connecting an electronic input device comprises the step of adapting the input device to receive a digital disk.

13. The multi-functional scanner as recited in claim 9, wherein the step of integrally connecting an electronic input device comprises the step of adapting the input device to receive a smart card.

14. The multi-functional scanner as recited in claim 9, wherein the step of integrally connecting an electronic input device comprises the step of adapting the input device to receive an electronic memory card.

15. The multi-functional scanner as recited in claim 9, wherein the step of integrally connecting an electronic input device comprises the step of adapting the input device to be connected to an internet for receiving the digital data therefrom.

16. The multi-functional scanner as recited in claim 9, wherein the step of mounting a display comprises the step of mounting a picture-in-picture display for displaying a plurality of the images simultaneously.

* * * * *